United States Patent [19]
Buneman et al.

[11] Patent Number: 5,978,790
[45] Date of Patent: Nov. 2, 1999

[54] METHOD AND APPARATUS FOR RESTRUCTURING DATA IN SEMI-STRUCTURED DATABASES

[75] Inventors: Peter Buneman, Philadelphia; Susan B. Davidson, Gladwyne, both of Pa.; Dan Suciu, Mountainside, N.J.

[73] Assignee: AT&T Corp., New York, N.Y.

[21] Appl. No.: 08/864,538

[22] Filed: May 28, 1997

[51] Int. Cl.⁶ .................................................. G06F 17/30
[52] U.S. Cl. ............................................ 707/2; 707/101
[58] Field of Search ..................... 707/1–6, 100–102, 707/2, 501, 513; 345/356, 357; 395/200.47, 200.48, 200.33

[56] References Cited

U.S. PATENT DOCUMENTS

| | | | |
|---|---|---|---|
| 5,151,697 | 9/1992 | Bunton | 701/1 |
| 5,379,419 | 1/1995 | Heffernan et al. | 707/1 |
| 5,555,403 | 9/1996 | Cambot et al. | 707/1 |
| 5,581,756 | 12/1996 | Nakabayashi | 707/2 |
| 5,625,815 | 4/1997 | Maier et al. | 707/8 |
| 5,644,740 | 7/1997 | Kiuchi | 345/357 |
| 5,721,904 | 2/1998 | Ito et al. | 707/8 |
| 5,737,591 | 4/1998 | Kaplan et al. | 707/1 |
| 5,740,421 | 4/1998 | Palmon | 707/4 |
| 5,812,134 | 3/1996 | Pooser et al. | 345/356 |

OTHER PUBLICATIONS

Louden, Kenneth C., Programming Langugaes: Principle and Practice, PWS Publishing Company, pp. 138–144, Dec. 1993.

Timo Niemi and Kalervo Jarvelin, Prolog–Based Meta–Rules for Relational Database Representation and Manipulation, IEEE Transactions on Software Engineering, vol. 17, No. 8, Aug., 1991.

*Primary Examiner*—Hosain T. Alam
*Attorney, Agent, or Firm*—Oliff & Berridge, PLC

[57] ABSTRACT

An apparatus and method for restructuring a database modeled by an edge-labeled tree. Portions of an output tree is generated by matching patterns of tree elements of a starting tree. Portions of the output tree are combined to form a complete output tree which may be restructured again until a final output tree presents a desired "view" of the starting database. If the pattern matches used in restructuring the starting tree is restricted to attributes of tree elements that only includes preceding edge information, successive tree restructuring may be composed into a single restructuring process that optimizes the restructuring by taking advantage of restructuring results of each of the original restructuring processes.

30 Claims, 15 Drawing Sheets

FIG. 20
| | EXPRESSION |
|---|---|
| 1 | { } |
| 2 | {ℓ=>t} |
| 3 | $t_1 \cup t_2$ |
| 4 | IF_THEN_ELSE_ |
| 5 | SELECT |
| 6 | TRAVERSE |
| 4 | $t_1 @ s$ |
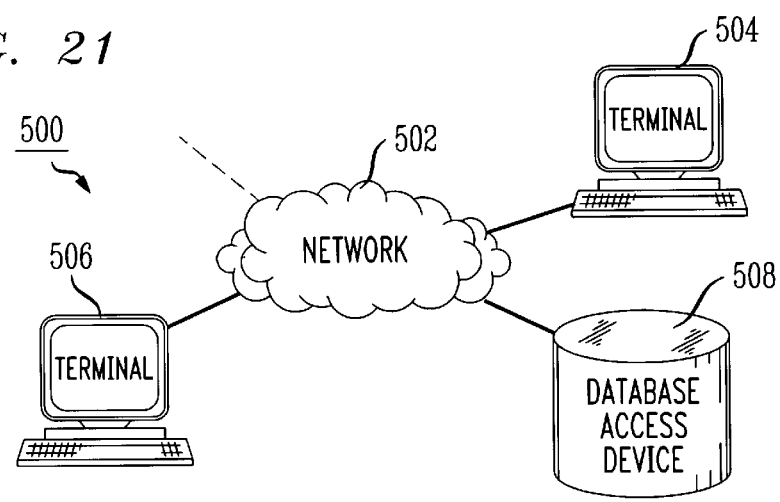
FIG. 21
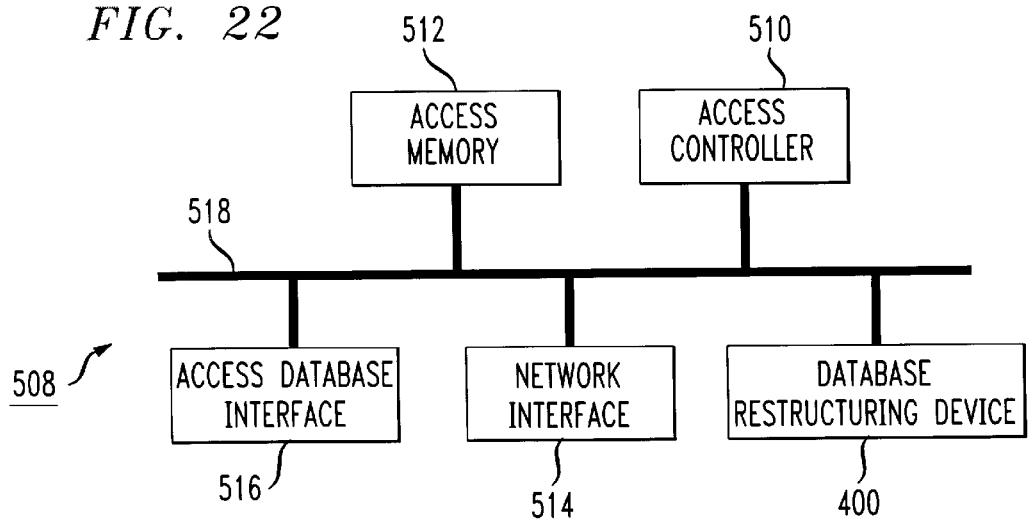
FIG. 22

METHOD AND APPARATUS FOR RESTRUCTURING DATA IN SEMI-STRUCTURED DATABASES

This Application is related to U.S. patent application Ser. No. 08/864,539, entitled "Database Access System With Optimizable Expressions", filed on even date herewith by the same inventors under common assignees, now pending.

BACKGROUND OF THE INVENTION

1. Field of Invention

This invention relates to a method and apparatus for restructuring data in a database.

2. Description of Related Art

Efficient access of data has become increasingly more important due to the expanded information availability from sources such as the Internet. Conventionally, large amounts of data are managed by techniques such as relational databases that provide convenient features for accessing the data. However, such databases require a prior knowledge of the types and number of data to be stored and thus have difficulty accounting for additions to the database of new data and their relationships to existing data that are previously unknown.

Unlike relational databases, semi-structured databases do not require a prior knowledge of the types and attributes of the data to be stored. Unfortunately, techniques for providing efficient access of the data in such databases are inefficient. Thus, there is a need for a technique to organize semi-structured databases so that efficient access to the information in these databases may be provided.

SUMMARY OF THE INVENTION

This invention provides an apparatus and method for restructuring a database that is modeled by an edge-labeled tree. The restructuring is achieved by generating portions of an output tree by matching patterns of tree elements of a starting tree. After all the portions of the starting tree have been considered for the pattern match, the resulting portions of the output tree are combined together to form a complete output tree which may be restructured again until the final output tree presents a desired "view" of the starting database.

The pattern matches include only properties that are local to an edge of the starting tree. This local property results in database restructuring that is independent of processing the starting tree either recursively or in parallel.

As indicated above, the restructuring process may be accomplished in successive stages. If the pattern matches used in restructuring the starting tree is restricted to attributes of tree elements that only includes preceding edge information, successive tree restructuring may be composed into a single restructuring process that optimizes the restructuring by taking advantage of restructuring results of each of the original restructuring processes.

BRIEF DESCRIPTION OF THE DRAWINGS

The invention is described in detail with reference to the following drawings, wherein like numerals represent like elements, and wherein:

FIG. 20 shows a table of a complete set of expressions;

FIG. 21 shows a diagram of a data access system;

FIG. 22 shows a block diagram of a data access device; and

DETAILED DESCRIPTION OF PREFERRED EMBODIMENTS

Figure 1:
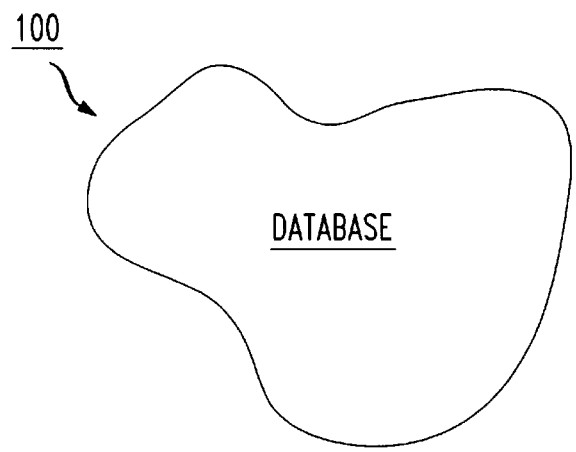
FIG. 1 is a diagram of a database.

FIG. 1 shows a diagram of an unstructured database 100. The database 100 contains data that are related to each other. However, the number and types of relationships among the data are not predetermined. Thus, new data that are unknown at the time the database 100 is established may be added at a later time. The way the new data relate to data already included in the database are also unknown at the time the database is established. The invention provides a method and apparatus to efficiently access databases such as the database 100 by restructuring the databases.

Figure 2:
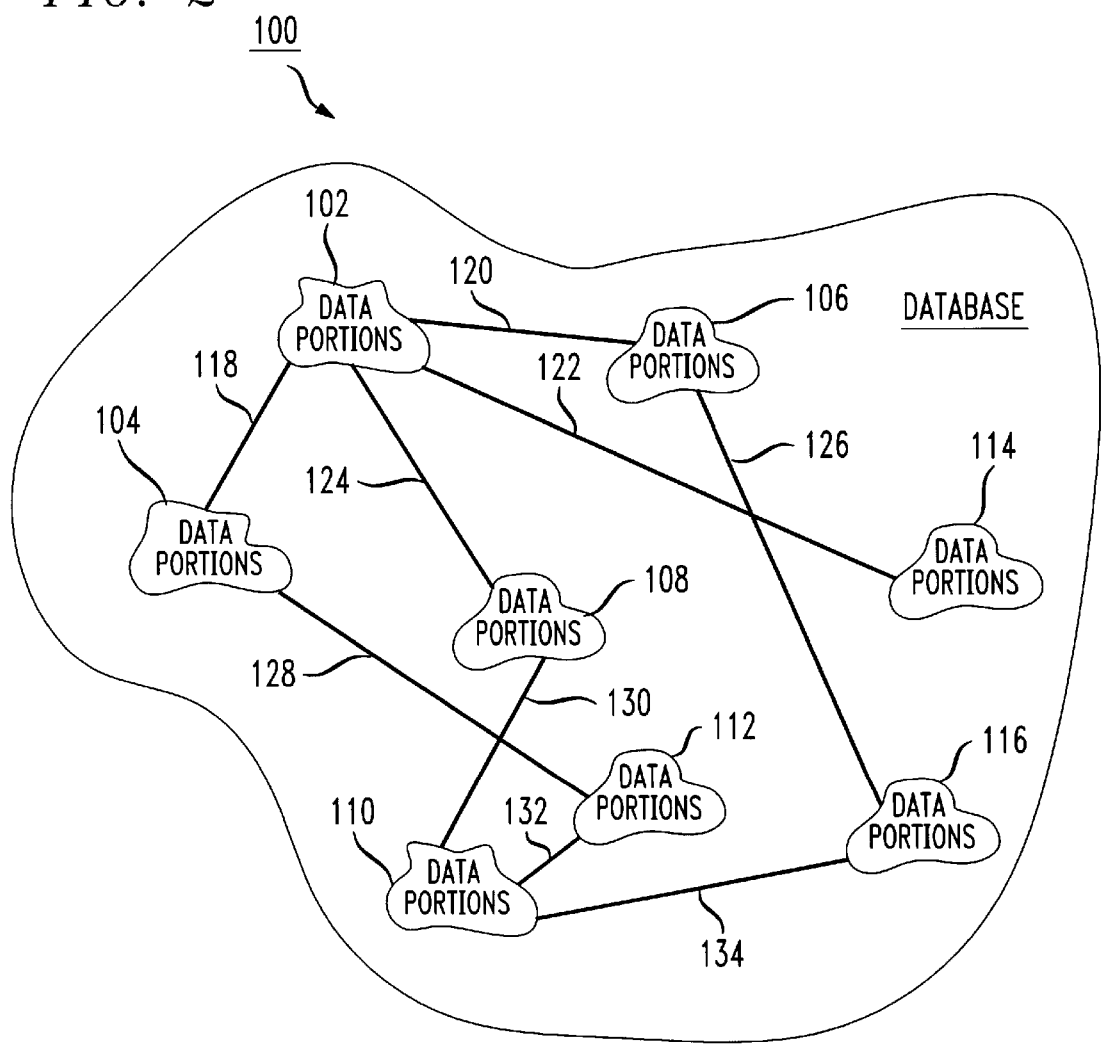
FIG. 2 is a diagram of portions of the database that have relationships to each other.

FIG. 2 shows data portions 102–116 of the database 100. The data portions 102–116 are related to each other by lines 118–134 connecting the related portions 102–116. Any new data portion may be added by simply including the new data portion and relating the new data portion to the existing data portions 102–116 represented by drawing additional lines.

Figure 3:
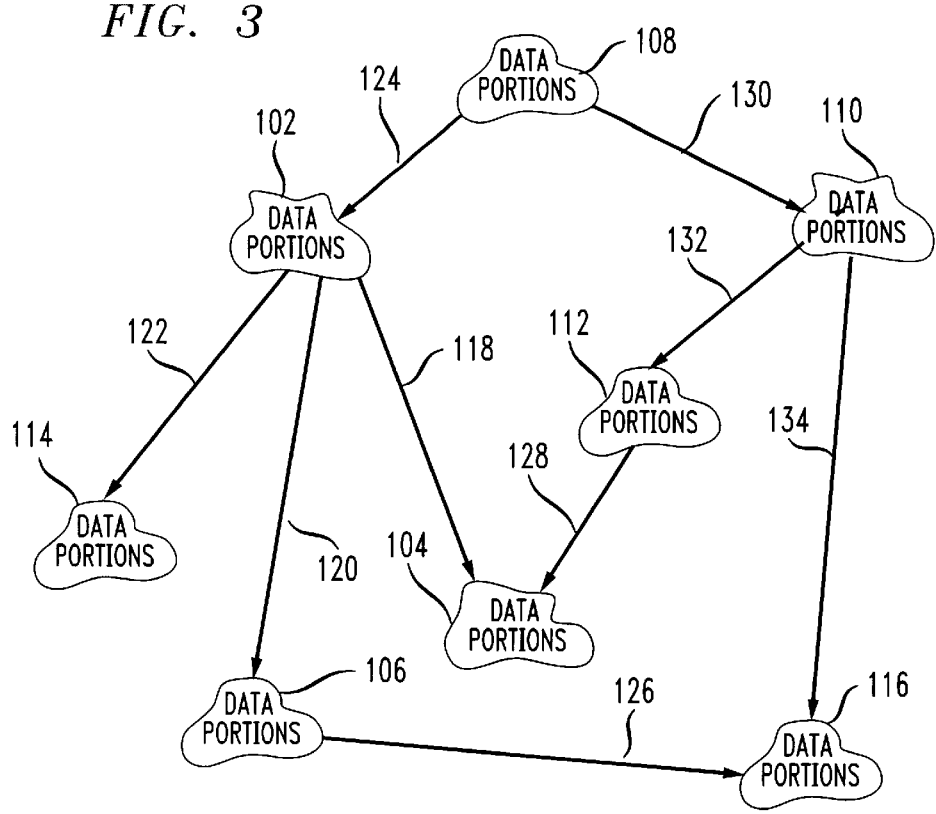
FIG. 3 shows the relationship of the data portions shown in FIG. 2 as an edge-labeled tree.

FIG. 3 shows the data portions 102–116 and relationships 118–134 of FIG. 2 modeled by a tree. The tree structures the database 100 starting with a single root node and relating the root node to other nodes through edges as shown in FIG. 2. For example, in FIG. 3, data portion 108 is selected as a root node. Data portions 102 and 110 are related to the data portion 108 through edges 124 and 130, respectively. Then, data portion 114 is related to data portion 102 by edge 122 and so on for all the data portions and their relationships.

In FIG. 3, the tree edges are changed into arrows which flow from a data portion higher in the tree hierarchy to a data portion that is lower in the tree hierarchy. The tree of FIG. 3 is an edge-labeled tree. The edge-labeled tree is not restricted to hierarchical structures but may have edges that flow upwards.

Figure 4:
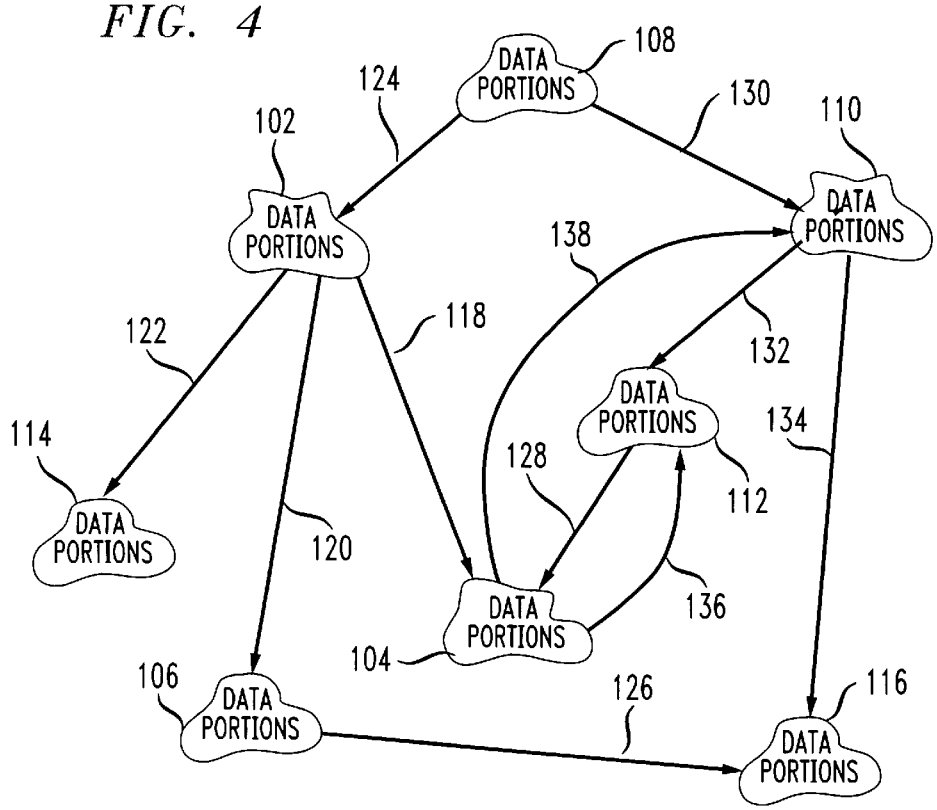
FIG. 4 shows the edge-labeled tree of FIG. 3 that include cyclic structures.

In FIG. 4, edges 136 and 138 are shown additionally connect data portions 104 to data portion 110 and data portion 104 to data portion 112, respectively. Thus, an edge-labeled tree may model data portions that have bi-directional relationships. While the relationships between the data portions 102–116 may be bi-directional, for simplicity and ease of discussion, it is assumed that these data relationships are unidirectional in the direction shown in FIG. 4.

The added edges 136 and 138 in FIG. 4 also demonstrate the concept of a cyclic structure. If the edge-labeled tree (tree for short) is traversed from the data portion 110 following the edges 132, 128, and 138, such tree traversal will result in a cycle without an end. Thus, for conventional tree traversal access techniques, such cyclic structures presents an unsolvable problem and is usually resolved by setting a limit to the depth of tree traversal.

Figure 5:
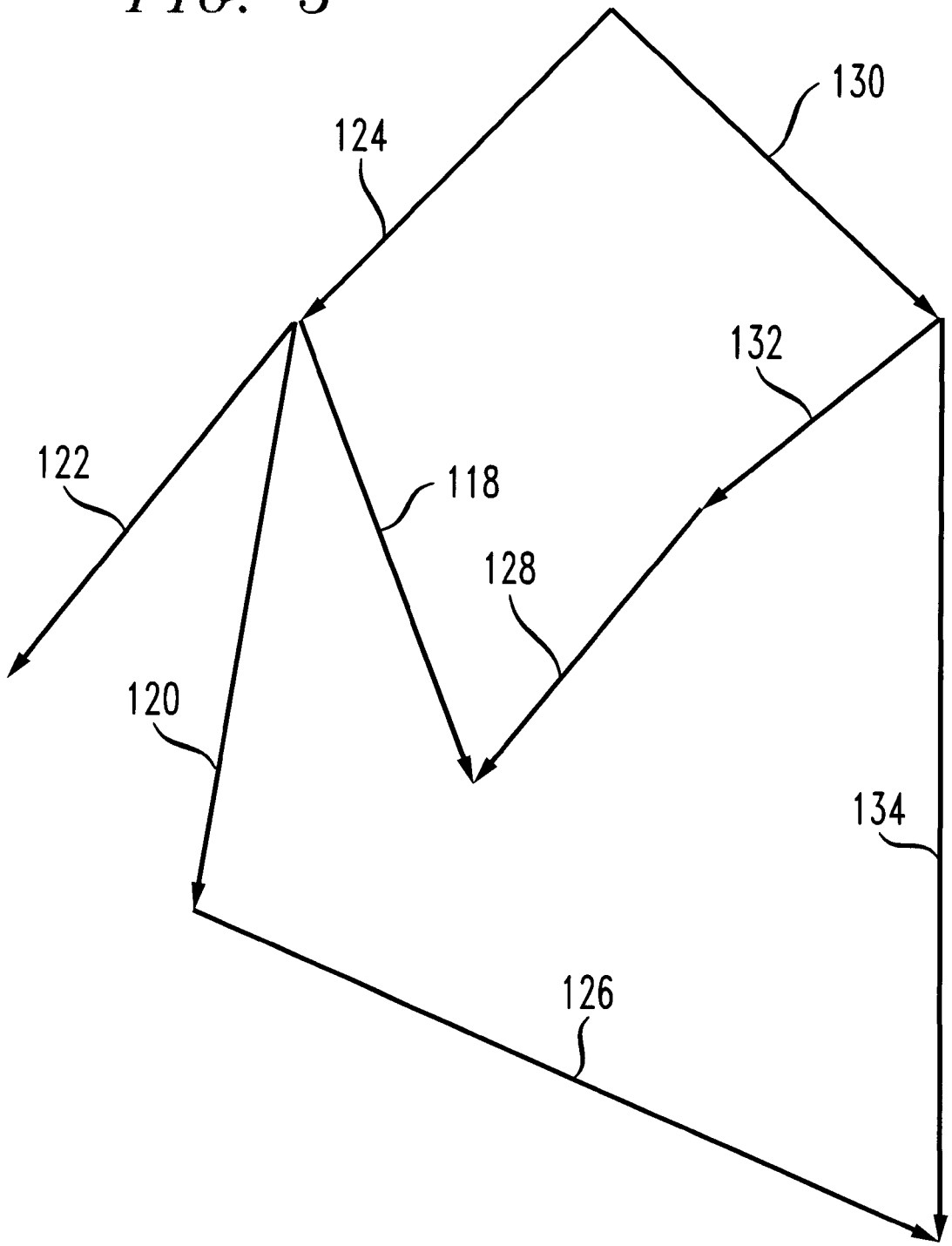
FIG. 5 shows the edge-labeled tree of FIG. 3 in a simplified form.

FIG. 5 shows a simplified form of the edge-labeled tree of FIG. 3. In this simplified form, all the information is stored in the edge-labels and the structure of the tree. The nodes of the tree become place holders and thus are unlabeled.

Tree elements of an edge-labeled tree includes nodes, edges and edge-labels. Nodes include, root nodes, intermediate nodes and leaf nodes. Edges connecting leaf nodes are called leaf edges.

Each of the tree elements of a tree has an attribute that identifies a quality of the tree element. Attributes of a tree element contain information relating to the tree element such as a type of the edge-label (i.e. string, number, etc.), an edge-label that precedes or follows the edge in the tree structure, and a marker of the edge or edges preceding or following the edge.

A marker is a label attached to the starting or the ending ends of an edge. Markers allow flexibility in reconnecting an edge to another part of the tree during restructuring operations.

Conventional database access techniques, such as techniques for accessing relational databases, generally have difficulty with semi-structured data such as modeled by edge-labeled trees. For example, relational database access methods must have explicit direction for how to traverse a tree. These directions cannot be provided unless the database is constructed based on predetermined structure expectations such as the numbers and types of attributes that may be encountered and what action to take for every possible circumstance. Without such predetermined expectations, accessing the database would be reduced to inefficient searches.

This invention provides a method and apparatus for generating a new database based on a starting database. The starting database is modeled as a first tree. The new database is generated by transforming portions of the first tree based on pattern matches of specified tree elements. When a specified pattern of tree elements is found, a portion of a second tree is formed. The combination of all the portions of the second tree formed by the above process generates the second tree that models the new database. Thus, the new database is a restructured starting database.

In order to precisely identify a pattern to be matched and the operations to be performed to generate the second tree, expressions are used that precisely identify tree element patterns and subsequent operations when the identified patterns are encountered. Expressions are merely shorthand techniques of indicating the actual operations required to generate the new database from the starting database. Expressions assume that databases are modeled by edge-labeled trees. Other methods of modeling databases may also be used without affecting the principals of the invention. However, for the discussion below, expressions are defined and used to restructure databases.

Figure 6:
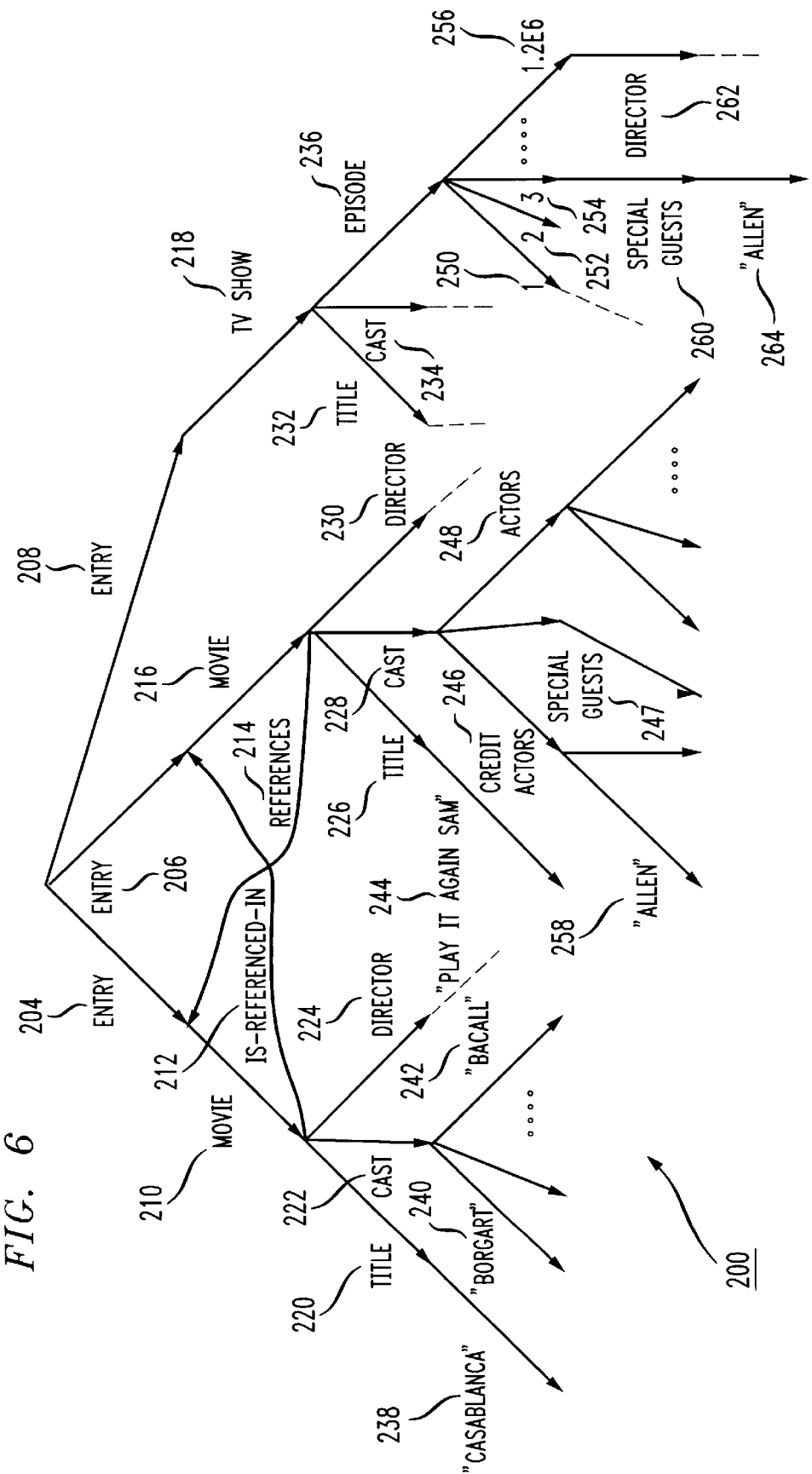
FIG. 6 shows an edge-labeled tree for a Movie database.

FIG. 6 shows an example of an edge-labeled tree 200 for a Movie database. The edges 204–264 contain the information of the Movie database. For example, following Movie 210 are edges Title 220, Cast 222 and Director 224. The edge following the Title edge is an edge labeled by a string "Casablanca" 238. The edge following the Cast edge 222 includes string edge-labels "Bogart" 240 and "Bacall" 242. As a matter of convenience, an edge is referred to as "containing" the information following that edge. Also edge-labels uniquely identify the corresponding edges and edge-labels are used without the word "edge". Thus, Movie 210 contains Title 220, Cast 222 and Director 224.

The edge-labeled tree 200 may have edge-labels of many different types. For example, as indicated above, "Casablanca" is a string value, however, edge-labels 250, 252, 254 and 256 are numerical values. In fact, the edge-labels may have any types and the types of the edge-labels may be used as part of a pattern specification.

The edge-labeled tree 200 has structure because the information related to Movies appear below the Movie edge-labels 210 and 216, and the same is true for TV Show 218. However, while Title, Cast and Director appear immediately below the Movie edges 210 and 216, corresponding labels for the TV Show 218 do not appear in the same order.

In addition, TV Show 218 contain other information such as numerical values 1, 2, 3 and 1.2E6, 250, 252, 254 and 256, respectively. In this regard, SpecialGuest 260, follows edges Episode 236 and 3 254 below TV Show 218. Movie 216 also has SpecialGuest 247. However, SpecialGuest 247 appears under Cast 228. The Movie 210 does not contain a SpecialGuest edge altogether. Moreover, the Movie edge-labeled tree 200 contains cyclic structures represented by references 214 and is-referenced-in 212, which connects Movies 216 and 210, respectively, to each other.

Figure 7:
FIG. 7 shows expression representations for elements of an edge-labeled tree.

FIG. 7 shows three simple expressions and their corresponding edge-labeled trees. The { } indicates an empty tree. Empty trees are leaves of an edge-labeled tree. The {lt} indicates a tree having an edge labeled "l" ending in a subtree {t} (a subtree is a tree that follows an edge). The third expression $t_1 t_2$ indicates a tree that is a union of subtrees $t_1$ and $t_2$ and may be represented by the edge-labeled tree having two edges ending in $\{t_1\}$ and $\{t_2\}$, respectively.

Expressions such as described above may be used in more complex expressions that generates a new tree based on a starting tree such as the Movie tree 200. For example:
Select t
  Where Entry \t←DB 200
is an expression that generates a new tree t from the starting tree 200 modeling the movie database (DB 200) based on the pattern "Entry \t." The above Select expression introduces several new constructs as explained below.

In the Select expression, "Where" specifies a pattern to be matched. In the above example, "Entry \t" indicates a pattern of an edge ending in a subtree. The \t is a variable that "binds" t to a subtree that follows the Entry edge. Thus, the pattern "Entry \t" would match any Entry edge label within the starting tree. The "←DB 200" indicates that the pattern in the Where clause of the Select expression is to be applied to the starting tree 200 modeling the Movie database. For convenience, the tree and the database modeled by the tree are equivalent. Thus, starting tree 200, database 200 and DB 200 referred to the same entity.

Applying the above Select expression to the database 200 as shown in FIG. 6, the Where "Entry \t" matches edge-labels 204, 206 and 208. Thus, t binds to each of the subtrees below each of the edge-labels 204–208.

Figure 8:
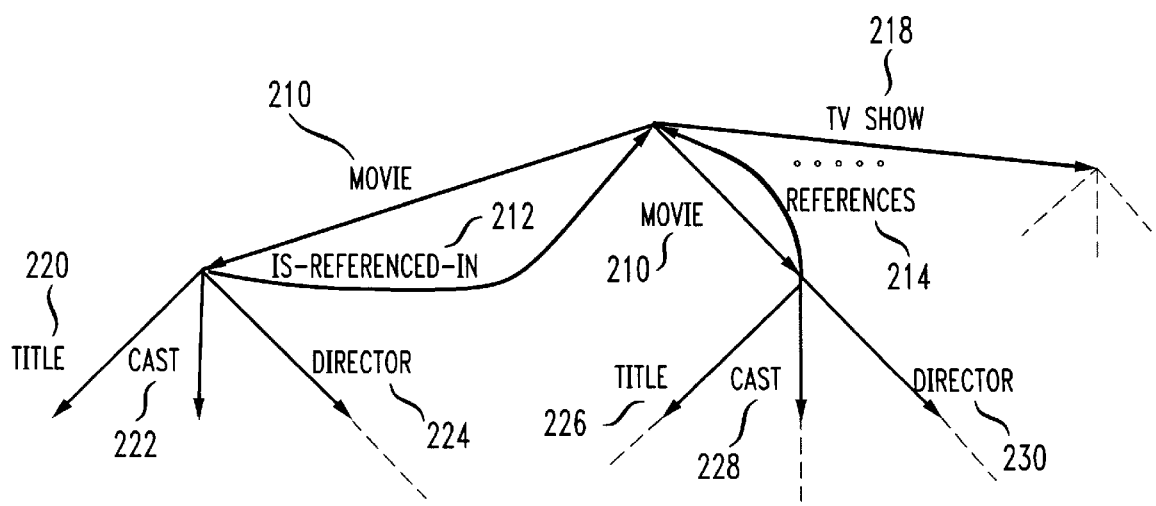
FIG. 8 shows a restructured tree generated by a first Select expression.

The Select expression generates a union of all the subtrees {t} that satisfies the pattern "Entry \t" ←DB 200. Thus, the tree generated by the Select expression is the union of the subtrees below the Entry edge-labels 204–208. The tree that is generated by the above Select expression is shown in FIG. 8.

As shown by the example above, an expression must generate a tree. This property permits the result of an expression to be operated upon by yet other expressions so that a sequence of expressions may be constructed and the result of this sequence of expressions is a tree. This is a "closure" property of expressions.

To demonstrate another restructuring of DB 200 using the Select expression, the following two new constructs are defined:

1) _; and
2) isstring(x).

The "_" is a wildcard construct indicating that any edge-label or subtree would satisfy this element of a pattern. Isstring(x) indicates that only x's that are string values (values enclosed in quotes) would match the pattern. Using these two additional constructs, the following more complex Select expression is possible:

$$\text{Select } \{\text{Tup} \Rightarrow \{\text{Actor} \Rightarrow x, \text{Title} \Rightarrow y\}\} \quad (1)$$

$$\text{Where Entry} \Rightarrow \text{Movie} \Rightarrow \{\text{Title} \Rightarrow \backslash y \text{ Cast} \Rightarrow \backslash z\} \leftarrow \text{DB 200}$$

$$\backslash x \Rightarrow \{\} \leftarrow z \bigcup (\text{Select } u \text{ Where}\_ \Rightarrow \backslash u \leftarrow z), \text{isstring}(x).$$

The above Select expression generates a tree having edges labeled Tup emanating from the root node. Following the Tup edge are two edges Actor and Title. Following Actor and Title are subtrees indicated by x and y which are subtrees that are bound as further defined by the pattern matching under the Where clause. Thus, the resulting tree is a union of subtrees where each subtree has an initial edge labeled Tup.

The first pattern under the Where clause specifies a sequence of edge labels Entry, Movie, and a subtree that includes two edge labels of Title and Cast. \y indicates that y is bound to the subtree immediately following Title and \z indicates that z is bound to the subtree immediately following Cast. The above pattern is to be searched for throughout DB 200.

Figure 9A:
FIG. 9A–FIG. 11 show subtrees restructured by a second Select expression.
Figure 9B:
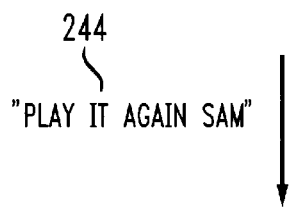

From the tree diagram shown in FIG. 6, the above pattern matching would find two subtrees for y having edge labels "Casablanca" 238 and "Play it again, Sam" 244 as shown in FIG. 9A and 9B. The Title 232 would not be selected because Movie is a required edge-label in the sequence of edge-labels. The Title 232 follows TV Show 218, which is not a Movie edge-label.

Figure 10A:
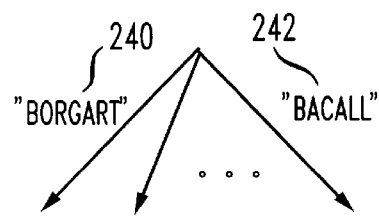
Figure 10B:
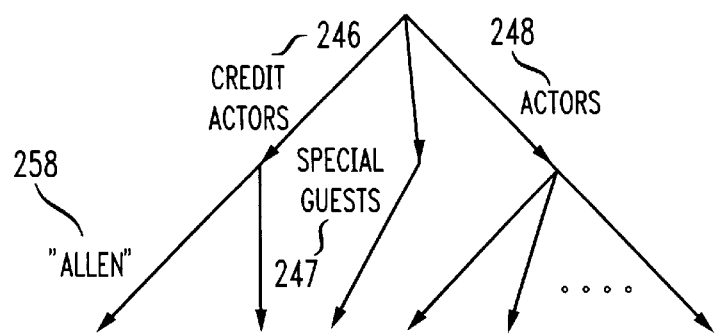

For each of the y subtrees, the subtree underneath the corresponding Cast edge-label are listed in FIGS. 10A and 10B. The z subtree corresponding to "Casablanca" 238 includes edges "Bogart" 240 and "Bacall" 242, plus other edges. The subtree under Cast 228 corresponding to "Play it again, Sam" 244, includes edge-labels CreditActors 246, SpecialGuest 247 and Actors 248, as well as all the subtrees underneath these three edges.

The second subclause in the Where clause binds the x to edges ending in leaf subtrees indicated by the { }. Thus, the x edges are leaf edges. The database from which the above pattern is to be searched is represented by a tree that is generated by the expression to the right of the "←". The tree is formed by a union of a tree specified by z and a tree formed by the Select expression that forms a union of trees u where u is a tree below any edge found in the tree z. The above generated tree is simply the tree z in union with all possible subtrees below the first edges of z.

Figure 11:
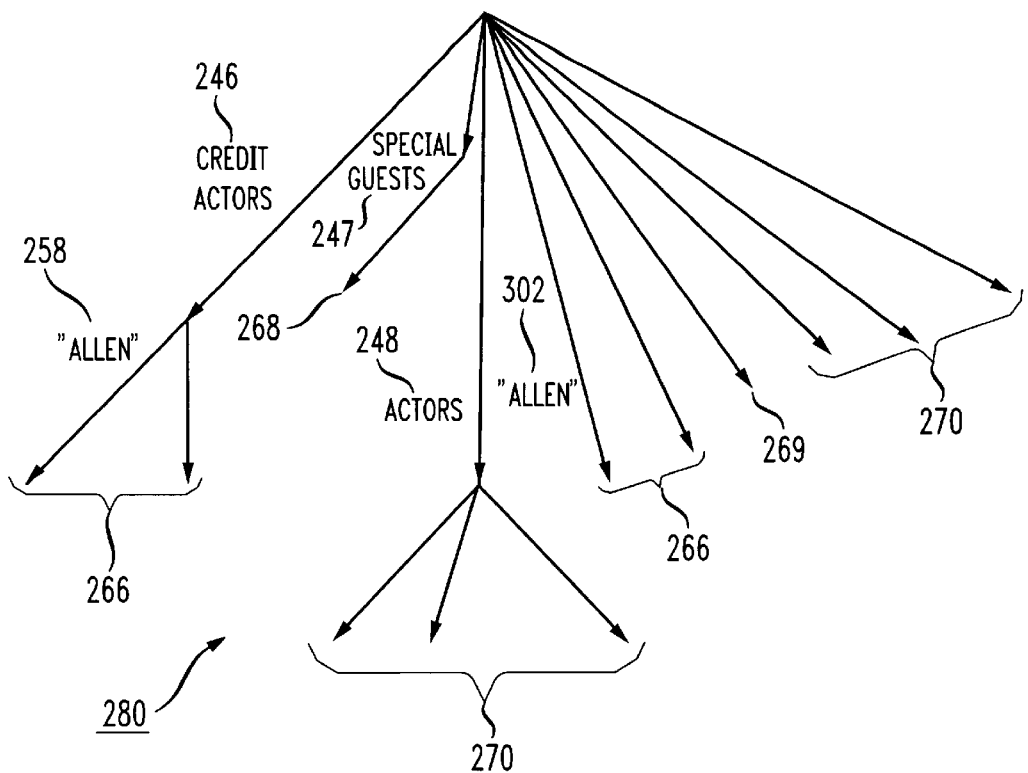

For the z tree corresponding to "Casablanca" 238, the above tree generated by the union of z and u will be identical to z because all the edges in z are leaf edges. Thus, u would be an empty tree. For the z tree corresponding to "Play it again, Sam" 244, the tree 280 resulting from the union of z and u is shown on FIG. 11. The tree 280 includes the original z plus u which includes subtrees 266, 268 and 270.

Figure 12:
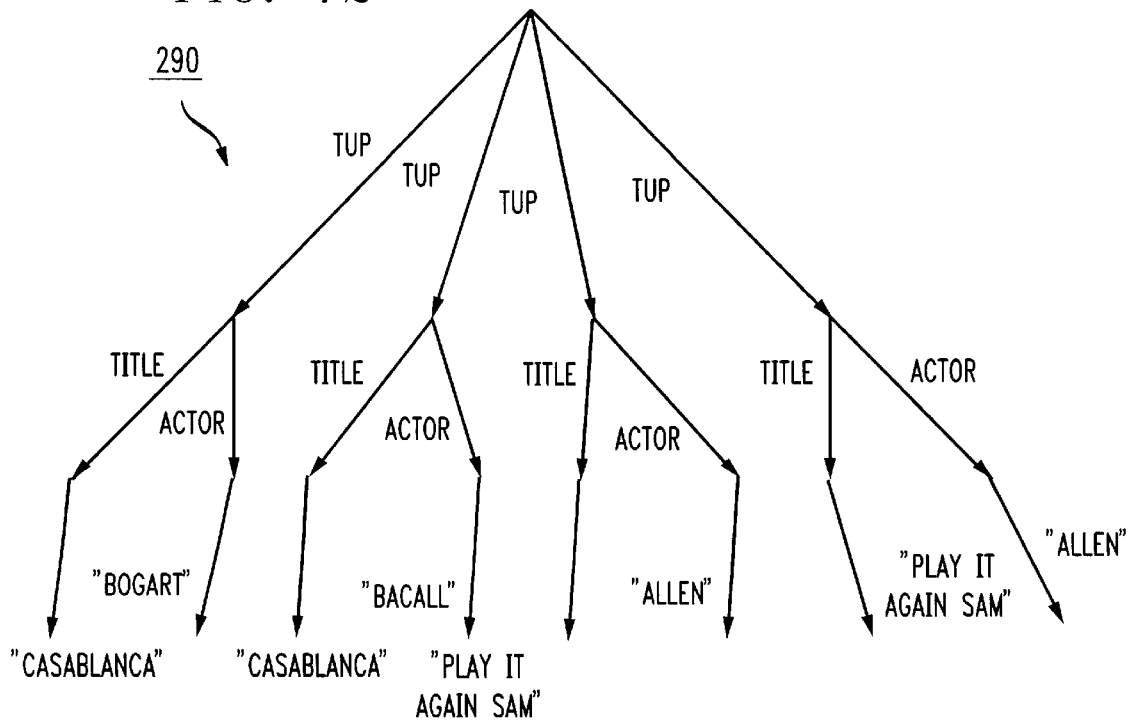
FIG. 12 shows an output tree generated by the second Select expression.

The last subclause isstring(x) eliminates all leaf edges having edge-labels that are not string characters. Thus, the edge-labels that match the specified pattern would be "Bogart" 240 "Bacall" 242, "Allen" 258, and "Allen" 302. Thus, the tree 290 resulting from the Select expression has four Tup edges as shown in FIG. 12.

As exemplified by the Select expression above, an expression is operative on edges of a tree based on only the attributes of edges identified in the pattern. For example, the pattern specified by the Where clause requires four edges in three levels. The first level edge must match Entry, the second level edge must match Movie, and the third level edges must match Title and Cast. As long as the above pattern is satisfied, the Select expression generates a tree. The union of all trees generated by the Select expression is the tree output by the Select expression.

Thus, the Select expression requires no more information than is "local" to the edges of the specified pattern. Expressions having this "local" property may be applied to generate new trees either recursively or in parallel with identical results. Recursive application of an expression means applying the expression to a tree starting with the edges emanating from the root node and working downward to the leaf edges. Applying an expression to a tree in parallel means applying the expression to each edge of the tree independently of the application of the expression to other edges. Thus, the "local" property of expressions results in a same tree regardless of the order of the application of the expression.

This "local" property of expressions enables the application of expressions to be independent of cyclic structures. Because the application of expressions may be applied to each edge independently of other edges, when cyclic structures are encountered, these structures are simply replicated in the generated trees. Thus, restructuring using expressions is independent of a topology of the tree. This topology independence permits the expressions to be applied to a tree independent of any depth requirement because expressions are unaffected by cyclic structures that restrict the flexibility of tree traversal methods.

The above Select expression exemplifies the property that an expression may be a combination of other expressions. For example, the above Select expression includes in the Where clause a second Select expression. Any number of other expressions may be embedded in an expression. Because expressions may be embedded within other expression, combination of a sequence of expressions may be reduced to a single expression. This reduction property permits expression optimization so that a number of steps required to restructure a database may be reduced to a minimum. This optimization property will be discussed later with reference to a Traverse expression.

Figure 13:
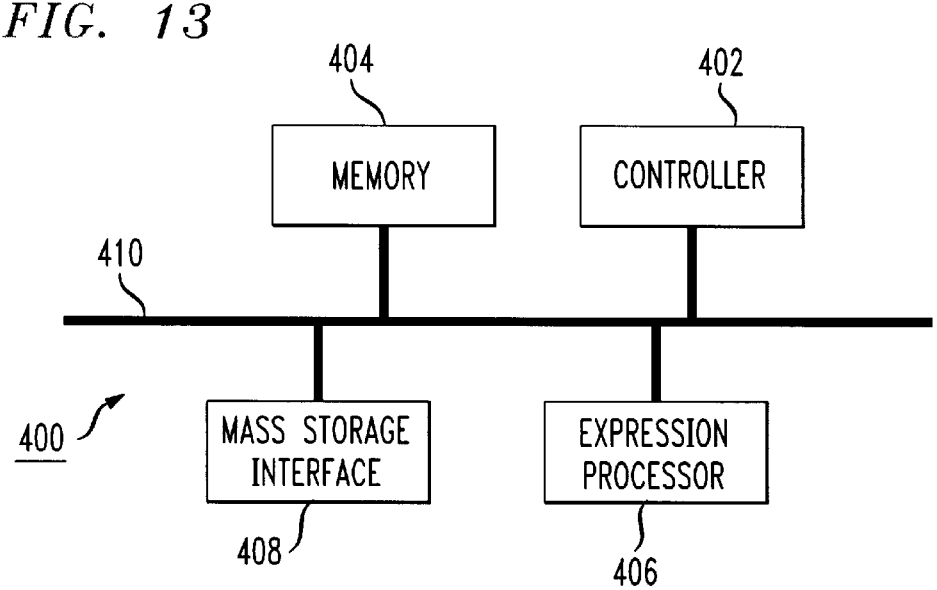
FIG. 13 shows a database processor.

FIG. 13 shows a database restructuring device 400. The database restructuring device includes a controller 402, a memory 404, an expression processor 406, and a mass storage interface 408. All of the above components are interconnected through a bus 410. The database restructuring device 400 restructures a database that is stored either in the memory 404 or in a mass storage device that is accessible through the mass storage interface 408.

Prior to restructuring a database, the controller 402 interfaces with either other processing units (not shown) or a user interface (not shown) and places expressions used to direct the restructuring of the database in the memory 404. The expressions may also reside elsewhere, however, for the convenience of description, the expressions are assumed to be loaded in the memory 404.

Figure 14:
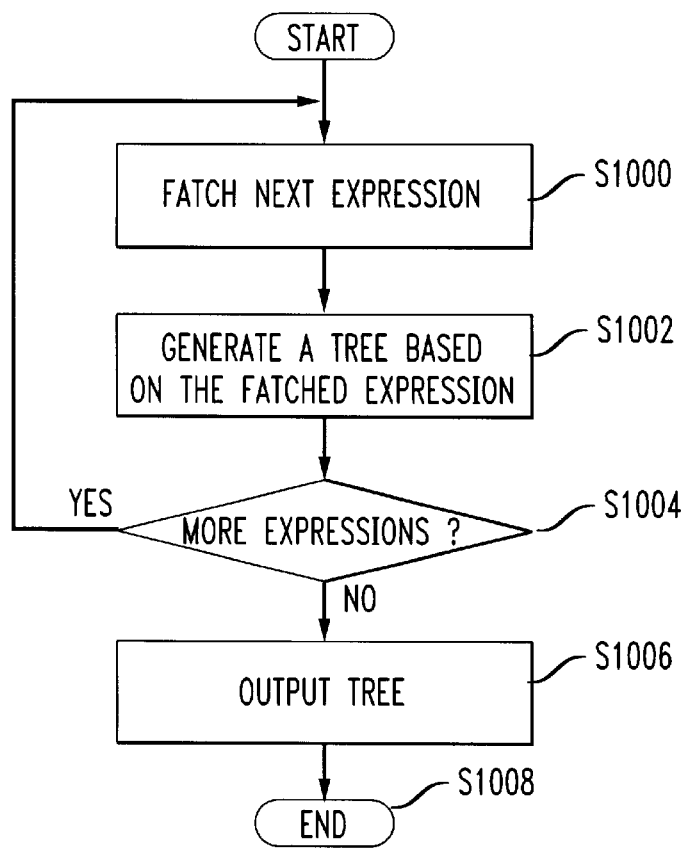
FIG. 14 shows a process of the data processor.

The controller also ensures proper access to the database either in the memory 404 or through the mass storage interface 408. After all of the preliminary preparation for restructuring a database is completed, the controller 402 directs the expression processor 406 to restructure the database based on the expressions stored in the memory 404. A process for processing the expressions is shown in FIG. 14.

In step S1000, the expression processor 406 fetches a next expression and then goes to step S1002. In step S1002, the expression processor 406 generates a tree (new database) based on the fetched expression and then goes to step S1004.

In step S1004, the expression processor 406 determines whether more expressions remain. If there are more expressions, the expression processor 406 returns to step S1000 and fetches the next expression. The "next expression" restructures the tree output by the previous expression. Otherwise, the expression processor 406 goes to step S1006 and outputs a generated tree and then goes to step 1008 and ends the expression processor process.

Figure 15:
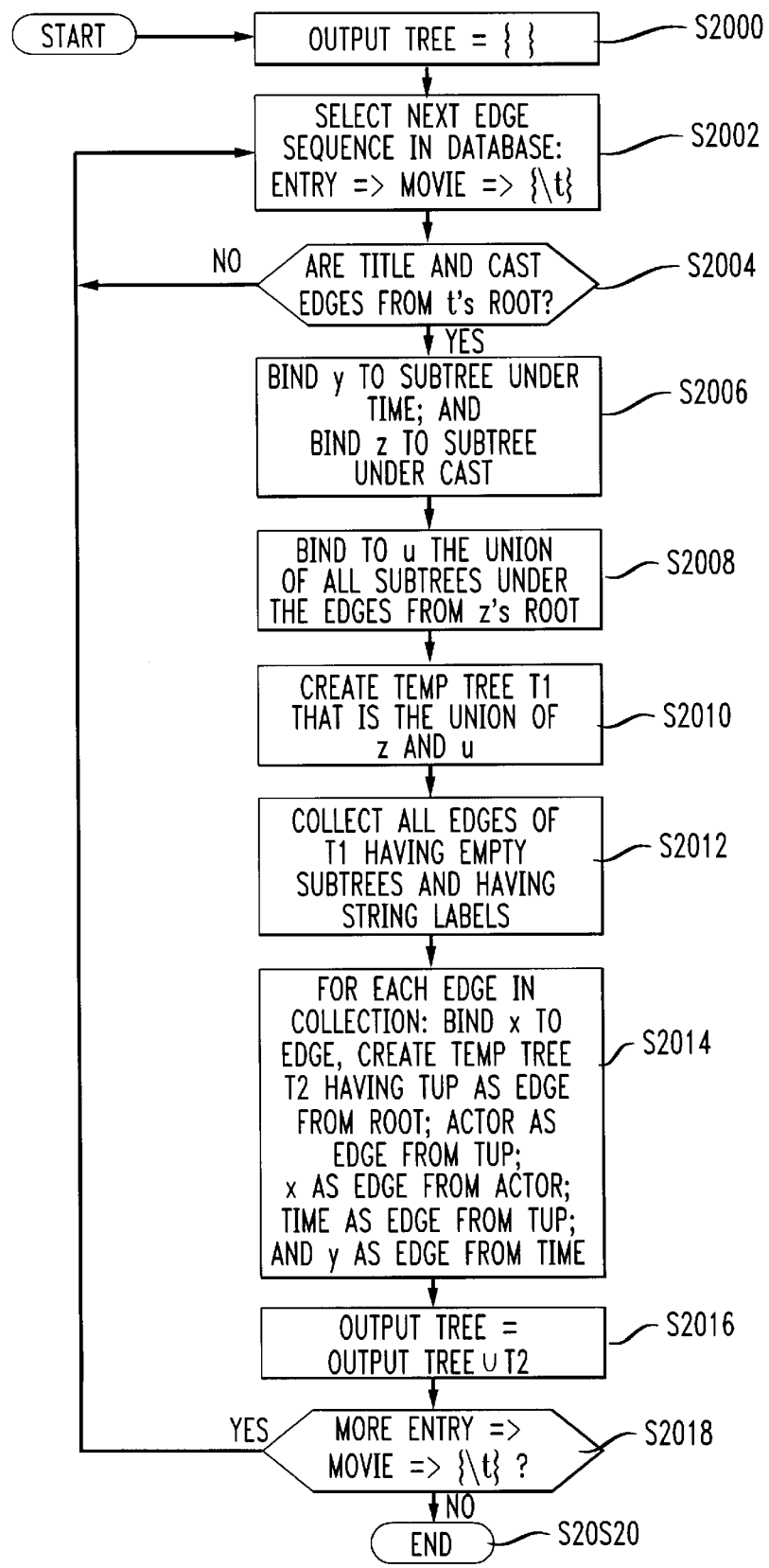
FIG. 15 shows an expression processor processing the second Select expression.

FIG. 15 shows the process of the expression processor 406 processing the above described Select expression (1) in detail. The starting tree 200 is assumed to be loaded and ready to be restructured. In step S2000, the expression processor 406 sets an output tree equal to an empty tree and then goes to step S2002. In step S2002, the expression processor 406 selects a next edge sequence in the database that matches the pattern "EntryMovie{\t}". Then the expression processor 406 goes to step S2004.

In step S2004, the expression processor determines whether Title and Cast edges are found in the subtree below the Movie edge. If the Title and Cast edges are found, the expression processor goes to step S2006; otherwise, the expression processor 406 returns to step S2002 and selects a next edge in the database.

In step S2006, the expression processor 406 binds y to the subtree that is under the Title edge and binds z to the subtree that is under the Cast edge and then goes to step S2008. In step S2008, the expression processor binds to u the union of all subtrees under the edges from z's root and then goes to step S2010. In step S2010, the expression processor 406 creates a temporary tree t1 that is the union of the tree z and the tree u and then goes to step S2012.

In step S2012, the expression processor 406 collects all the edges of t1 that have empty subtrees and then selects those edges that have labels that are strings. Then, the expression processor 406 goes to step S2014. In step S2014, the expression processor 406 binds x to each of the selected edges and creates a temporary tree t2 having:

(1) A Tup edge from the root;

(2) Actor as an edge from Tup;

(3) x as an edge from Actor;

(4) Title as an edge from Tup; and (5) y as an edge from Title.

Then the expression processor 406 goes to step S2016. In step S2016, the expression processor sets the output tree equal to the prior output tree, which was set to { } in step S2000, in union with t2 and then goes to step S2018.

In step S2018, the expression processor 406 determines whether there are more edges that matches the pattern "EntryMovie{\t}". If there are more edges that match the above pattern, the expression processor 406 goes to step S2002; otherwise, the expression processor 406 goes to step S2020 and ends the process.

An expression may have a construct that immediately generates portions of the second tree of the new database from portions of the first tree of the starting database identified by the pattern of the expression. For example, "if SpecialGuest_ then featuring_" goes through the first tree and generates a second tree changing all edge-labels of SpecialGuest in the first tree to featuring for the second tree, a Case clause similar to the "if_then_else_" expression is used as a subclause in a first Traverse expression below.

$$\text{Traverse DB 200 giving } X_1, X_2 \qquad (2)$$

$$\begin{array}{ll} \text{Case TV Show} \Rightarrow \_ & \text{then } X_1 := \{\text{TV Show} \Rightarrow X_2\} \\ \text{Case SpecialGuest} \Rightarrow \_ & \text{then } X_2\{\text{featuring} \Rightarrow X_2\} \\ \text{Case \textbackslash l} \Rightarrow \_ & \text{then } X_1 := \{1 \Rightarrow X_1\} \\ & \qquad\quad X_2 := \{1 \Rightarrow X_2\} \end{array}$$

The first Traverse expression connects edges that are distant from each other in the tree hierarchy while using only local information. The first Traverse expression uses a concept called markers which are flags that mark the beginning and end of an edge. Markers are used in the first Traverse expression to interconnect multiple trees into a single output tree T. When the root node of a tree is marked by a marker, then the tree is said to be indexed by the marker.

The above first Traverse expression creates a first new tree and a second new tree having roots indexed by $X_1$, $X_2$, respectively. The Case clauses of the first Traverse expression are similar to the "if_then_else_" expression discussed earlier. By convention, the output tree has the root node indexed by $X_1$.

Each of the three Case clauses generate the beginning and the end of each edge by either markers $X_1$ or $X_2$ as indicated by the Then subclause. The Case clauses are taken in the order as they appear in the first Traverse expression for each of the markers $X_1$ and $X_2$. The restructuring process of the above first Traverse expression is described in detail below.

The first Case clause specifies that the pattern "TV Show _" is to be found. Once found, the first Case clause marks the beginning of the TV Show edge 270 with $X_1$ and marks the end of the TV Show edge 270 with $X_2$. The marked TV Show edge 270 is thus generated as an element of the first new tree.

Figure 16A:
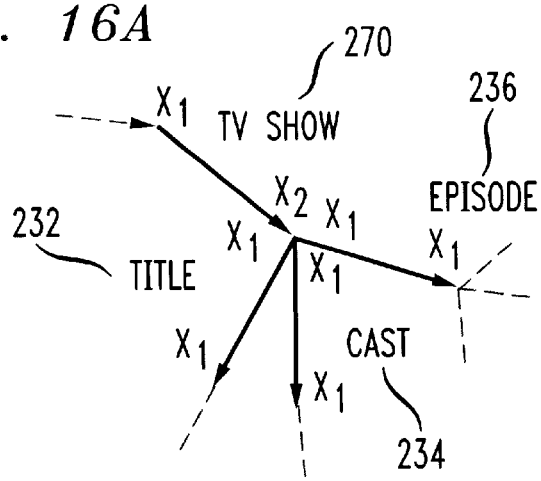
FIG. 16A–FIG. 17C shows subtrees and markers applied to the subtrees by a first Traverse expression.
Figure 17A:
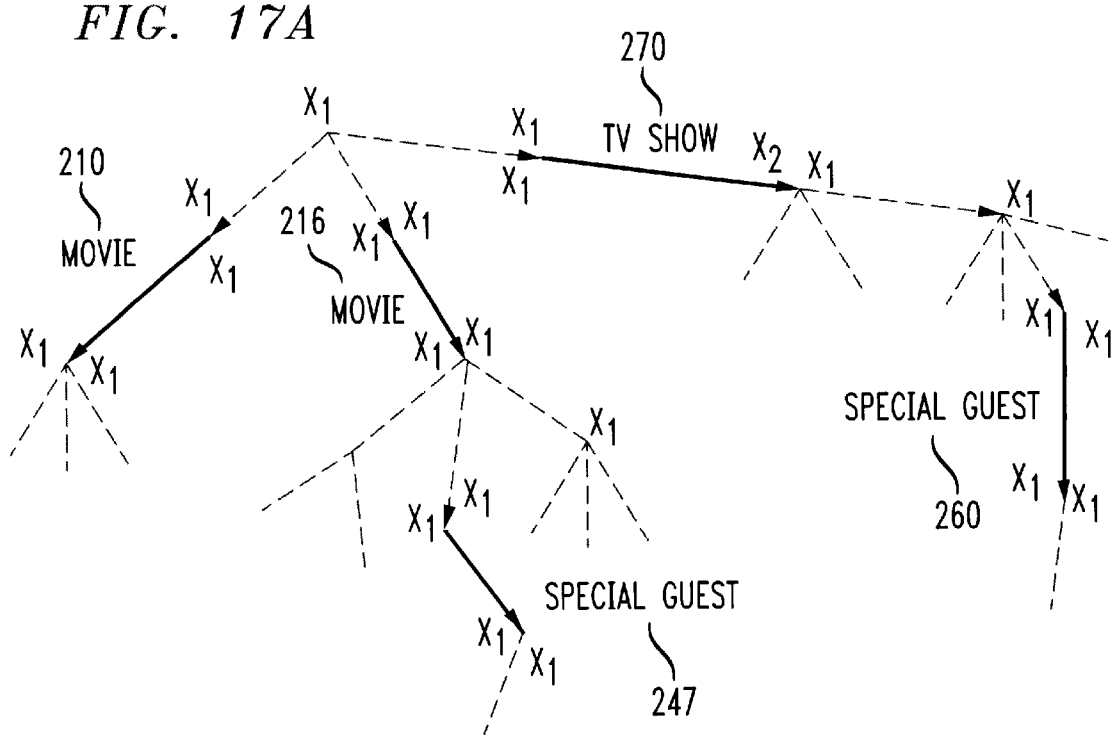

The first new tree is further constructed by the third Case clause which specifies a pattern "\l_" that identifies every edge in the database 200. Because the first Case clause has already processed the TV Show edge 270, the third Case clause identifies all other edges of the database 200 and marks each of those edges with $X_1$ at the beginning and the end. Thus, with the exception of the TV show edge 270, the first new tree is simply the starting tree of the database 200 with each of the edges marked by $X_1$ at the beginning and $X_1$ at the end. The TV Show edge 270 is marked by $X_2$ at its end. A portion of the first new tree is shown in FIG. 16A showing the TV Show edge 270 having markers $X_1$ at its beginning and marker $X_2$ at its end. The first new tree in its entirety is shown in FIG. 17A.

The second new tree is generated by the second Case clause and the third Case clause. The second Case clause specifies a pattern "SpecialGuest_". When this pattern is found, the "SpecialGuest" edge-label is changed to "Featuring" and the new Featuring edge is marked by $X_2$ at its beginning and end. The Featuring edge is thus generated as an edge in the second tree.

The remainder of the tree is processed by the third Case clause that matches every other edge in the starting tree of database 200. Each edge other than the SpecialGuest edge, which was already processed by the second Case clause, is replicated but marked with $X_2$ at its beginning and end.

Figure 16B:
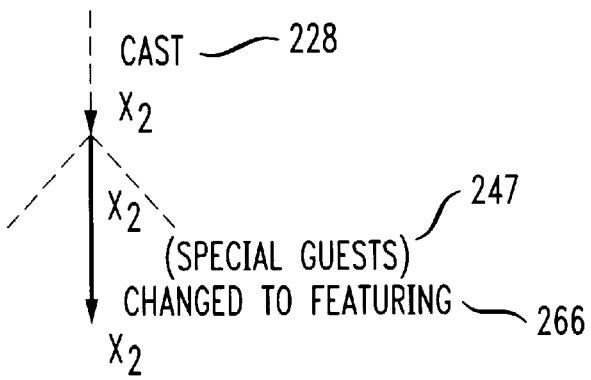
Figure 16C:
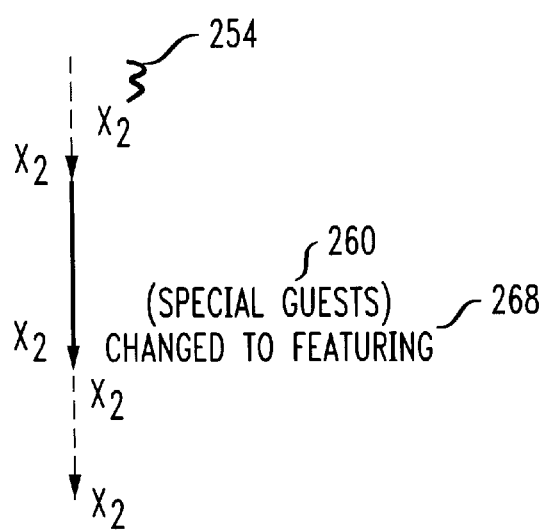
Figure 17B:
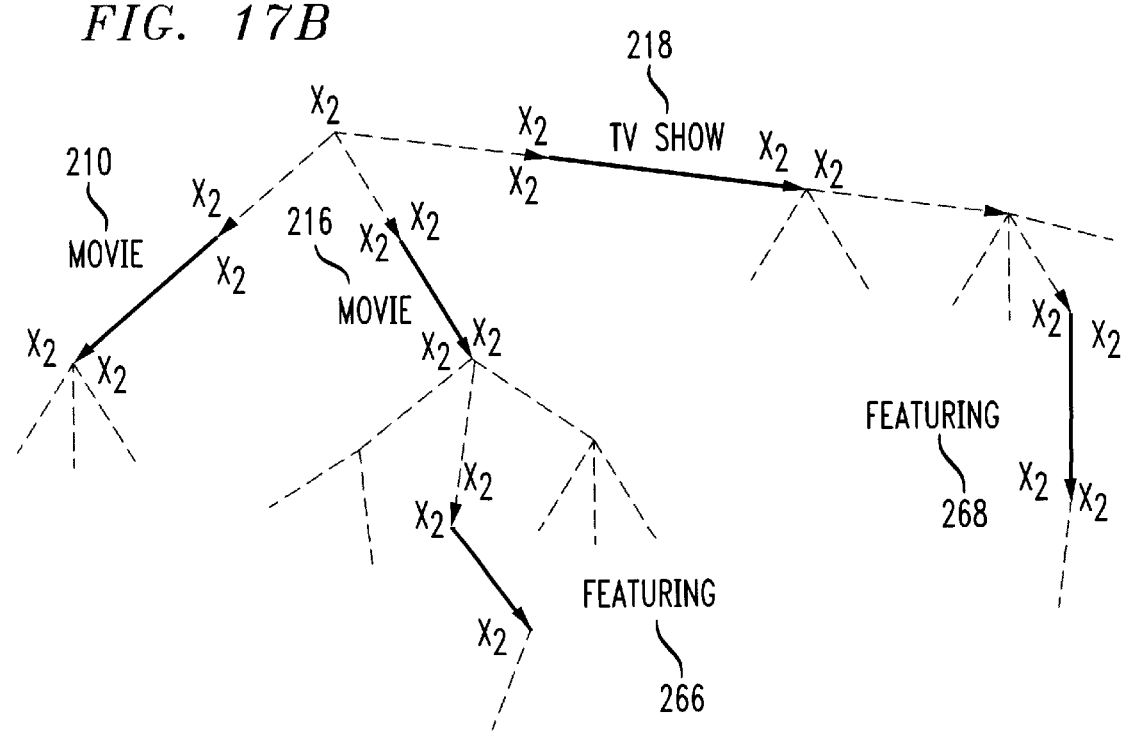

As can be seen from FIG. 6, the starting tree has two SpecialGuest edges 247 and 260. The SpecialGuest edges 247 and 260 is generated as Featuring edges 266 and 268 in the second new tree. Portions of the second new tree are shown in FIG. 16B and FIG. 16C. The second new tree in its entirety is shown in FIG. 17B.

The first Traverse expression combines the ends of each edge with the beginnings of each following edge having the same markers in the first and second new trees. Thus, for the most part, the edges are connected exactly the same as the edges were connected in the starting tree. However, for the TV Show edge 270, the end is marked with $X_2$ instead of $X_1$ even though the TV Show edge 270 appears in the tree indexed by $X_1$. Thus, in the marker matching process, the TV Show edge 270 is connected to the same location as TV Show edge 218 of the second new tree marked by $X_2$. Also, the SpecialGuest edges 247 and 260 of the starting tree is relabeled as Featuring edges 267 and 268 in the second new tree. The tree T output by the first Traverse expression is shown in its entirety in FIG. 17C.

Figure 17C:
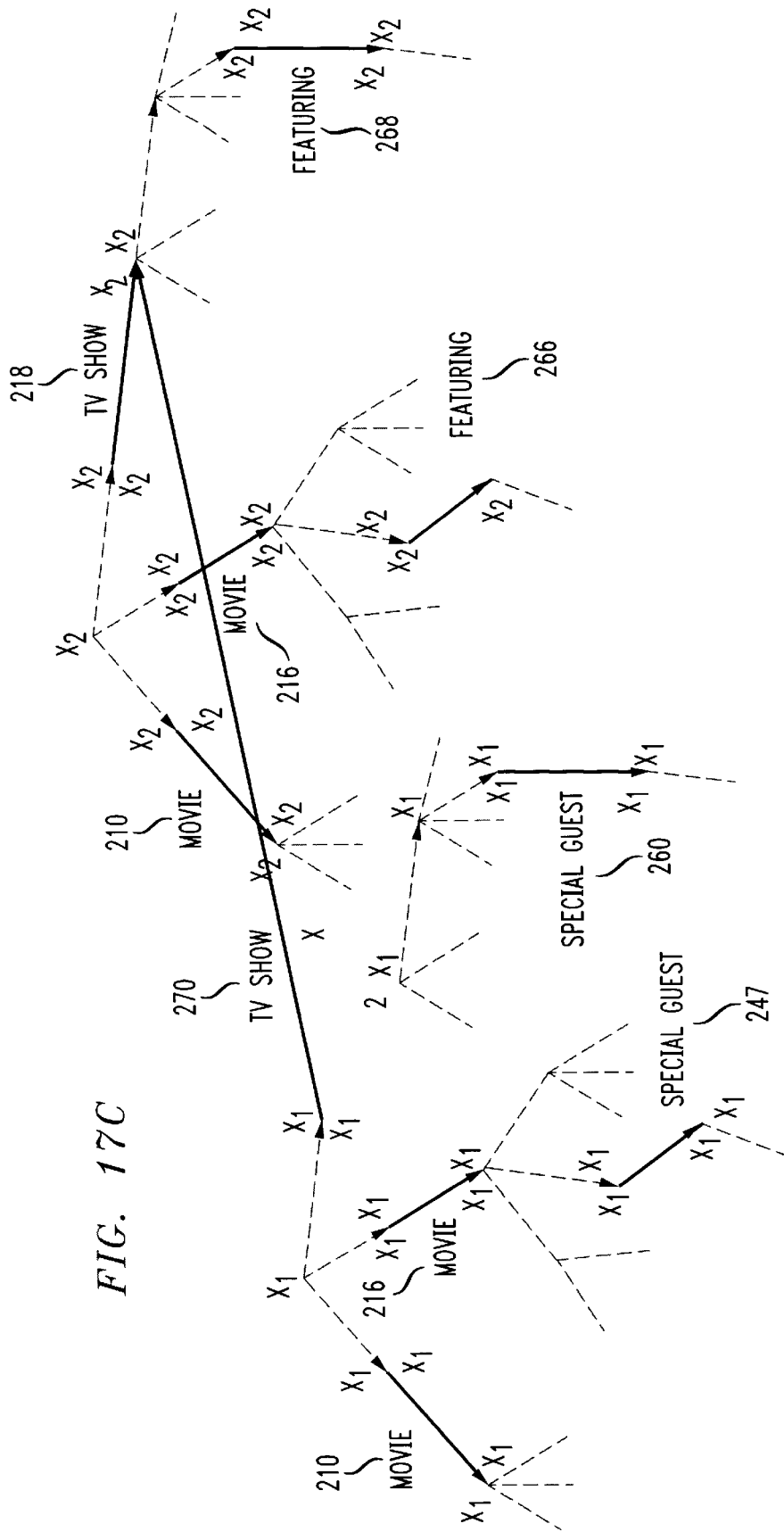

As can be seen from FIG. 17C, the output tree T has a root node indexed by $X_1$. The TV Show 270 is connected to the subtree below TV Show 218 of the second new tree. Thus, if the output tree T was traversed, the TV Show edge 270 would lead to the subtree below the TV Show edge 218 of the second new tree. In addition, the subtree of the first new tree corresponding to the subtree below TV Show edge 218 of the second new tree is no longer reachable. Also, except for the subtree below TV Show edge 218, the rest of the second new tree is also not reachable. Thus, the above first Traverse expression restructured the starting tree by replacing a complete subtree of the first new tree with a modified subtree of the second new tree. This is an append operation indicated by @ which will be further described later.

The tree T shown in FIG. 17C may be further processed by a second Traverse expression. For example, if it is desired to gather all the SpecialGuest edges and the subtrees following the SpecialGuest edges together to quickly access this information, the following second Traverse expression may be used:

$$\text{Traverse } T \text{ giving} Y_1, Y_2 \qquad (3)$$
$$\text{Case SpecialGuest} \Rightarrow \_ \text{ then}$$
$$Y_1 := \{\text{SpecialGuest} \Rightarrow Y_2\}$$
$$\text{Case } \backslash a \Rightarrow \_ \text{ then}$$
$$Y_1 := Y_1, Y_2 := \{a \Rightarrow Y_2\}$$

The above second Traverse expression generates two trees indexed by $Y_1$ and $Y_2$. The $Y_1$ index tree is empty because the second Case clause generates a $Y_1$ indexed tree for every edge to be replaced by an empty edge (labeled by $\epsilon$) being marked by marker $Y_1$. Thus, the $Y_1$ indexed tree is the union of: 1) many empty edges labeled by $\epsilon$ and whose end edges are marked by $Y_1$; and 2) the SpecialGuest edge 247 marked $Y_2$ at its end.

The second Traverse expression also generates a second tree indexed by $Y_2$. This tree has all its edges marked at both ends by marker $Y_2$. The second Traverse expression combines the above two trees by connecting edges having the same markers. The resulting tree is shown in FIG. 18 with the unreachable portions of the tree removed.

Figure 18:
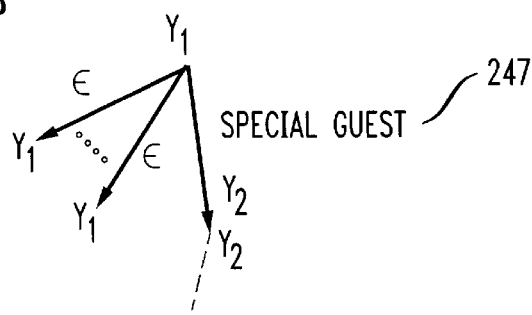
FIG. 18 shows a tree generated by a second Traverse expression.

As can be seen from FIG. 18, the second Traverse expression generated a tree that has only the SpecialGuest edge emanating from the root. All other edges of the tree indexed by $Y_1$ are merely $\epsilon$ edges. Thus, the second Traverse expression restructured the tree output by the prior first Traverse expression so that direct access to SpecialGuest 247 edge is made available.

The above first and second Traverse expressions (2) and (3) may be composed into a single composed Traverse expression that minimizes processing required by the expression processor 406 as compared to processing the first and second Traverse expressions individually in sequence. The composed Traverse expression is as follows:

$$\text{Traverse DB 200 giving} Y_1 \cdot X_1, Y_2 \cdot X_1, Y_1 \cdot X_2, Y_2 \cdot X_2 \qquad (4)$$
$$\text{CaseTVShow} \Rightarrow \_ \qquad \text{then}$$
$$Y_1 \cdot X_1 := Y_1 \cdot X_2,$$
$$Y_2 \cdot X_1 := \{\text{TV Show} \Rightarrow Y_2 \cdot X_2\}$$
$$\text{Case SpecialGuest} \Rightarrow \_ \qquad \text{then}$$
$$Y_1 \cdot X_1 := \{\text{SpecialGuest} \Rightarrow Y_2 \cdot X_1\},$$
$$Y_2 \cdot X_2 := \{\text{Featuring} \Rightarrow Y_2 \cdot X_2\}$$
$$\text{Case } \backslash l \Rightarrow \_ \qquad \text{then}$$
$$Y_1 \cdot X_1 := Y_1 \cdot X_1\},$$
$$Y_1 \cdot X_2 := Y_1 \cdot X_2\},$$
$$Y_2 \cdot X_1 := \{l \Rightarrow Y_2 \cdot X_1\},$$
$$Y_2 \cdot X_2 := \{l \Rightarrow Y_2 \cdot X_2\}.$$

The above composed Traverse expression generates the same tree as shown in FIG. 18. However, if recursively processed, the composed Traverse expression only needs to traverse the starting tree once instead of twice (once for each of the first and second Traverse expressions). In addition, the composed Traverse expression may take advantage (or anticipate) of the results of both the first and second Traverse expressions while matching the patterns for each of the expressions as discussed below.

The reduced processing occurs in the second Case clause. This second Case clause performs the pattern matching and edge marking of both the first and second two Traverse expressions. In FIG. 17C, the TV Show edge 270 was marked at its beginning with marker $X_1$ and at its end with $X_2$. Thus, the result after the first Traverse expression is to reroute the ending edge of the TV Show edge 270 to the corresponding TV Show edge 218. This rerouting eliminated the SpecialGuest edge 260 that was below the TV Show edge 270 before the rerouting occurred.

Further, because the first Traverse expression also changed SpecialGuest edge 260 into Featuring edge 268, the TV Show edge 270 no longer leads to a following SpecialGuest edge. Thus, neither the SpecialGuest edge 260 nor the Featuring edge 268 need to be processed by the second case clause that corresponds to the second Traverse expression. Only the SpecialGuest edge 247 needs to be processed. Thus, the composed Traverse expression allows anticipation of results of multiple patterns and be processed with far greater efficiency than if the starting tree of database 200 was processed by the first and second Traverse expressions sequentially.

The above optimization process may be accomplished only if the pattern matches of each expression do not require information of edges following an edge of the pattern. Such information requirement would force traversal of the entire starting tree before a pattern match may be determined, thus nullifying the potential optimization that may be achieved. Accordingly, to obtain optimization, the attributes of the tree elements must be further restricted to only those attributes that indicate information that is above an edge and not below the edge.

Figure 19A:
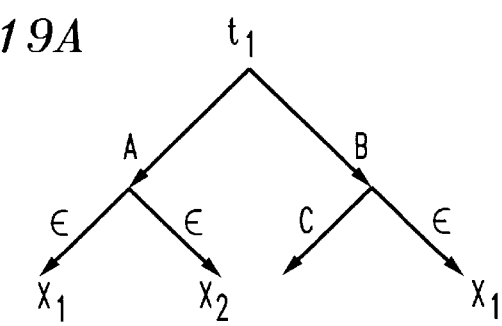
FIGS. 19A–19D shows trees related to an $t_1 @ \vec{s}$ expression.

The Traverse expression applies the @ (append) operations which is now described by example. The @ sign is an append operator and expression $t_1@\vec{s}$ indicates that all the indexed subtrees of $t_1$ is replaced by a set or collection of subtrees each indexed by a different marker in $\vec{s}$. For example, FIG. 19A shows a tree $t_1$ having edges A and B emanating from its root. Following the A edge are two $\epsilon$ edges that end in $X_1$ and $X_2$ indexes. The B edge is followed by a C edge and an empty edge ending in a $X_1$ index.

Figure 19B:
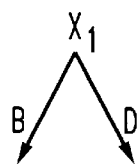
Figure 19C:
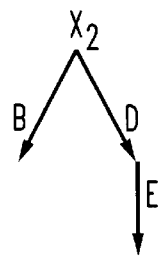
Figure 19D:
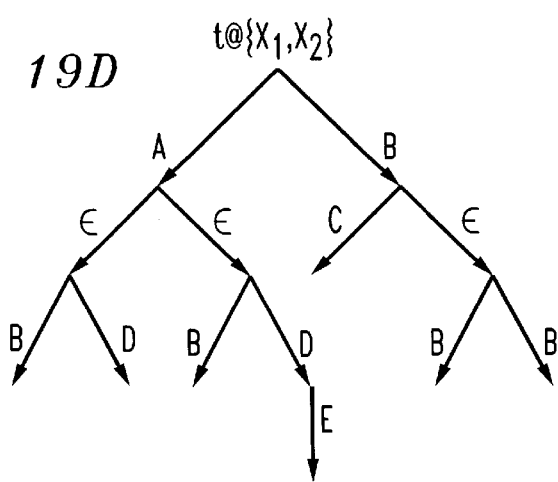

FIG. 19B shows an $X_1$ index subtree and FIG. 19C shows an $X_2$ index subtree. Both the $X_1$ and $X_2$ indexed subtrees are included in $\vec{s}$. The result of $t_1@\vec{s}$ is shown in FIG. 19D where all the markers in $t_1$ are replaced by the index subtrees of FIG. 19B and FIG. 19C. Thus, the "@" joins trees vertically while the "z,900" joins trees horizontally.

FIG. 20 is a table showing a complete set of expressions for restructuring trees. Other expressions may be constructed as well as other shorthand means for indicating patterns. For example, [^Movie] may indicate any edge that is not a Movie edge. Or _* may indicate either a subtree or an edge occurring any number of times. As indicated above, expressions are merely shorthands for describing database restructuring so that access to information of a database may be efficiently accomplished.

The above examples of the Select and Traverse expressions demonstrate that edge-labeled trees may be modified at arbitrary depths using only local information and using expressions which generate a tree that is independent of whether the starting tree is processed recursively or in parallel. In addition, the Traverse expression demonstrates a restructuring of a starting tree that can clearly identify unused portions of trees generated by prior expressions. Because these unused portions may be easily eliminated, the Traverse expression enables optimization of the restructuring process by identifying tree fragments that may be eliminated without affecting the output tree. In addition, further optimization may be obtained if attributes used in the patterns are restricted to only information preceding an edge and processing the starting tree recursively so that combinations of expressions may take advantage of processing performed by each expression.

In summary, expressions used to restructure trees has the following properties:

(1) Using only information local to the identified edge pattern;
(2) Generate a tree that may be processed by further expressions;
(3) Generates the same tree either recursively or in parallel; and
(4) Allowing a single expression to form a same tree as a sequence of expressions.

The result of structuring a database using the above types of expressions is a new database having desired information conveniently labeled and properly organized so that queries for information in the new database may be more efficiently accomplished than possible in the original starting database. Thus, searching information in large unstructured databases may be accomplished efficiently and effectively by first restructuring a semi-structured database using expressions that conform to the characteristics identified above.

FIG. 21 shows a database access system 500 that permits efficient data access based on data restructuring as described above. The database access system 500 includes a network 502 that connects subscribers 501 and 503 to a database access device 508. Other subscribers may also be connected to the database access device 508 as represented by the dotted line 505. Also, other database access devices may be connected to the network as specific implementation requires. Each of the subscribers 501 and 503 include terminals 506 and 504, respectively. As indicated by the dots underneath each of the terminals 506 and 504, many terminals may be included within each subscriber 501 and 503.

The database access device 508 is coupled to a subscriber expressions database 507 and information databases 509. The information databases 509 represents databases that contain information which subscribers 501 and 503 desires to access. The subscriber expressions database 507 contain expressions which are tailored for each subscriber 501 and 503. The operation of the database access system 500 is described below.

When a subscriber 501 and 503 subscribes to the database access system 500, a subscriber expression is constructed that restructures a database of the information databases 509 containing the desired information to produce a "view" that is specific for a subscriber 501 and 503. Using the Movie database 200 as an example, the subscriber 501 may desire all SpecialGuest to be labeled Featuring when the SpecialGuest edge appears under the TV Show edge. Thus, a subscriber expression is constructed to restructure the Movie database of the information databases 509 so that the subscriber 501 may assume that the Movie database is restructured according to their requirements.

When a user of the subscriber 501 desires to access the Movie database, a user expression is constructed either by the user, by a program resident in the terminal 506, or by the database access device 508. This expression assumes that the Movie database has been restructured by the subscriber expression tailored for the subscriber 501. For example, the user expression may further restructure the database to surface all the SpecialGuest edges and the subtrees under the SpecialGuest edges so that ready access to the information under the SpecialGuest edges may be accomplished.

After the successful construction of the user expression, the terminal 506, for example, sends the user expression to the database access device 508 through the network 502. The database access device 508 receives the user expression and identifies the corresponding subscriber expression in the subscriber expressions database 507. After retrieving the subscriber expression in the subscriber expressions database 507, the database access device 508 combines the user expression with the subscriber expression to construct a composed expression that optimizes the database restructuring so that a minimum amount of processing is required to produce a final restructuring. Only at this point, is the Movie database in the information databases 509 actually restructured. The restructured Movie database is then provided to the user 506 for accessing the desired information.

FIG. 22 shows a block diagram of the database access device 508. The database access device 508 includes an access controller 510, an access memory 512, the database restructuring device 400, a network interface 514 and an access database interface 516. The above components are coupled together through bus 518.

When the terminal 506 sends a database access request that includes a user expression, the database access request is received over the network interface 514 and transferred to the access controller 510. The access controller 510 accesses the subscriber expressions database 507 to retrieve the subscriber expression and loads the subscriber expression in the access memory 512. Then the access controller 510 establishes the connections to the information databases 509 through the access database interface 516. Both the subscriber expressions database 507 and the information databases 509 may be local to the access controller 510 such as residing in the access memory 512. However, for the convenience of discussion it is assumed that the subscriber expressions database 507 and the information databases 509 are remote to the access controller 510 and the access controller 510 establishes connections to the databases through the access database interface 516.

After the access controller 510 establishes connections to the information databases 509 and retrieves the subscriber expression, the access controller 510 activates and transfers control to the database restructuring device 400 to process the user expression and the subscriber expression for restructuring the database requested by the user.

The database restructuring device 400 composes the user expression and the subscriber expression into an optimized composed expression that minimizes the processing required to restructure the requested database. After the composed expression is constructed, the database restructuring device 400 restructures the requested database by generating a new database using the composed expression. When the restructuring process is completed, control returns to the access controller 510 which then makes the restructured database available to the user through the network interface 514 so that the user may access the information from the restructured database.

Figure 23:
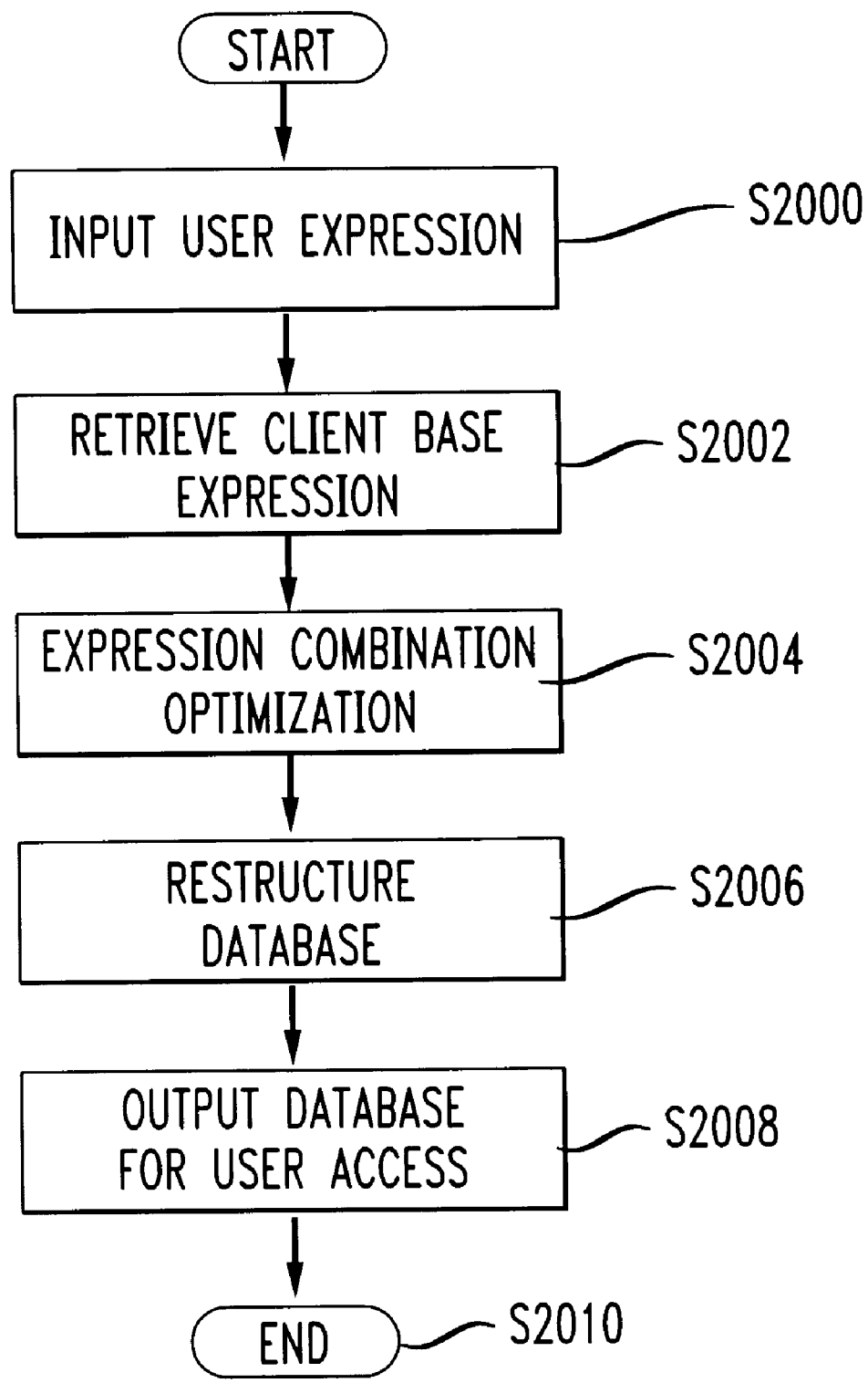
FIG. 23 shows a flowchart of a data access device process.

The process described above is shown in FIG. 23. In step S2000, the access controller 510 inputs the database access request and the user expression, and goes to step S2002. In step S2002, the access controller 510 retrieves the subscriber expression and establishes connections to the information databases 509 and goes to step S2004. In step S2004, the access controller 510 transfers the control over to the database restructuring device 400 which generates the optimized composed expression. After the optimized composed expression is generated, the database restructuring device 400 goes to step S2006 and restructures the requested database. After the requested database is restructured, the database restructuring device 400 returns control to the access controller 510 in step S2008 and the access controller 510 makes the restructured database available for user access and then goes to step S2010 and ends the process.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method of processing an unstructured database that is structured by an edge-labeled tree forming a semi-structured database, comprising:

modeling the semi-structured database as a first edge-labeled tree;

selecting at least a first portion of the first edge-labeled tree based on at least one pattern of at least one tree element of the first edge-labeled tree;

generating at least one portion of a second edge-labeled tree; and constructing the second edge-labeled tree based on the generated at least one portion of the second edge-labeled tree.

2. The method of claim 1, wherein the tree element of the first edge-labeled tree includes an attribute of an edge of the first edge-labeled tree.

3. The method of claim 2, wherein the attribute includes at least one of an edge-label, a type of the edge-label, an edge-label of an edge that precedes the edge, an edge-label of an edge that follows the edge, a marker of an edge, and a marker of an edge that either precedes or follows the edge.

4. The method of claim 3, wherein the edge is an empty edge.

5. The method of claim 1, further comprising matching a specified pattern of at least one tree element with the at least one tree element of the first edge-labeled tree, wherein the second edge-labeled tree generated by the matching step remains the same independent of an order that the matching step proceeds through the first edge-labeled tree.

6. The method of claim 5, wherein the matching step proceeds in either a recursive order or a parallel order through the first edge-labeled tree.

7. The method of claim 1, wherein the generating step comprises:

selecting a second portion of the first edge-labeled tree, the second portion being identified by the pattern of the at least one tree element of the first edge-labeled tree; and combining the second portion of the first edge-labeled tree with at least one specified tree element to form the at least one portion of the second edge-labeled tree.

8. The method of claim 7, wherein the at least one specified tree element includes at least a modified tree element of the first edge-labeled tree.

9. The method of claim 7, wherein the at least one specified tree element includes at least one of an edge having a specified edge-label, markers, and a subtree.

10. The method of claim 9, wherein the markers label a beginning and ending of edges of a plurality of subtrees that are generated by the generating step, the combining step connecting edges of the subtrees by matching a same marker of corresponding edges of the subtrees.

11. The method of claim 10, wherein subtrees that are unreachable from a root node of the second edge-labeled tree are not processed.

12. The method of claim 7, wherein a plurality of portions of the second edge-labeled tree are formed by the combining step, the plurality of portions of the second edge-labeled tree are combined by an union to construct the second edge-labeled tree.

13. The method of claim 1, further comprising constructing a third edge-labeled tree starting with the second edge-labeled tree, wherein the third edge-labeled tree is constructed by:

selecting at least a portion of the second edge-labeled tree based on at least one pattern of at least one tree element of the second edge-labeled tree;

generating at least one portion of the third edge-labeled tree; and constructing the third edge-labeled tree based on the generated at least one portion of the third edge-labeled tree.

14. The method of claim 13, wherein the third edge-labeled tree is constructed starting with the first edge-labeled tree by composing the selecting, generating and constructing steps for constructing the second and the third edge-labeled trees.

15. The method of claim 14, wherein composing is performed by:

eliminating non-reachable portions of the third edge-labeled tree before processing the first edge-labeled tree;

generating at least one portion of the third edge-labeled tree based on anticipated results of both generating steps for constructing the second and the third trees; and constructing the third edge-labeled tree based on the generated at least one portion of the third edge-labeled tree.

16. A database processing device processing an unstructured database using an edge-labeled tree forming a semi-structured database, comprising:

a memory containing a first semi-structured database ordered into a first edge-labeled tree;

an expression processor; and a controller coupled to the memory and the expression processor, wherein the expression processor generates a second semi-structured database ordered as a second edge-labeled tree by:

selecting at least a first portion of the first edge-labeled tree based on at least one pattern of at least one tree element of the first edge-labeled tree;

generating at least one portion of a second edge-labeled tree; and constructing the second edge-labeled tree based on the generated at least one portion of the second edge-labeled tree.

17. The device of claim 16, wherein the tree element of the first edge-labeled tree is an attribute of an edge of the first edge-labeled tree.

18. The device of claim 17, wherein the attribute includes at least one of an edge-label, a type of the edge-label, an edge-label of an edge that precedes the edge, an edge-label of an edge that follows the edge, a marker of an edge, and a marker of an edge that either precedes or follows the edge.

19. The device of claim 18, wherein the edge is an empty edge.

20. The device of claim 16, wherein the expression processor matches a specified pattern of at least one tree element with at least one tree element of the first edge-labeled tree, the second edge-labeled tree generated by the expression processor remaining the same independent of an order that the matching step proceeds through the first edge-labeled tree.

21. The device of claim 20, wherein the expression processor proceeds in either a recursive order or a parallel order through the first edge-labeled tree.

22. The device of claim 16, wherein the expression processor selects a second portion of the first edge-labeled tree, the second portion being identified by the pattern of the at least one tree element of the first edge-labeled tree, the expression processor combining the second portion of the first edge-labeled tree with at least one specified tree element to form the at least one portion of the second edge-labeled tree.

23. The device of claim 22, wherein the at least one specified tree element includes at least a modified tree element of the first edge-labeled tree.

24. The device of claim 22, wherein the at least one specified tree element includes at least one of an edge having a specified edge-label, markers, and a subtree.

25. The device of claim 24, wherein the markers label a beginning and ending of edges of a plurality of subtrees that are generated by the expression processor, the expression processor connecting edges of the subtrees by matching a same marker of corresponding edges of the subtrees.

26. The device of claim 25, wherein subtrees that are unreachable from a root node of the second edge-labeled tree are not processed by the expression processor.

27. The device of claim 22, wherein the expression processor combines a plurality of portions of the second edge-labeled tree by a union operation to construct the second edge-labeled tree.

28. The device of claim 16, wherein the expression processor constructs a third edge-labeled tree starting with the second edge-labeled tree, wherein the expression processor constructs the third edge-labeled tree by:

selecting at least a portion of the second edge-labeled tree based on at least one pattern of at least one tree element of the second edge-labeled tree;

generating at least one portion of the third edge-labeled tree; and constructing the third edge-labeled tree based on the generated at least one portion of the third edge-labeled tree.

29. The device of claim 28, wherein the expression processor constructs the third edge-labeled tree by a composing process.

30. The method of claim 29, wherein the expression processor composes by:

eliminating non-reachable portions of the third edge-labeled tree before processing the first edge-labeled tree;

generating at least one portion of the third edge-labeled tree based on anticipated results of both generating steps for constructing the second and the third trees; and constructing the third edge-labeled tree based on the generated at least one portion of the third edge-labeled tree.

* * * * *